United States Patent
Weingart et al.

(10) Patent No.: US 12,462,659 B2
(45) Date of Patent: *Nov. 4, 2025

(54) CROSS SYSTEM SENSOR DATA CONTROL

(71) Applicant: Alarm.com Incorporated, Tysons, VA (US)

(72) Inventors: Noah Robert Weingart, Arlington, VA (US); Abraham Joseph Kinney, Vienna, VA (US); Fabian Emilio Philipe Camargo, Falls Church, VA (US); Andrei Aurelian Furtuna, Annandale, VA (US); David James Hutz, Herndon, VA (US)

(73) Assignee: Alarm.com Incorporated, Tysons, VA (US)

( * ) Notice: Subject to any disclaimer, the term of this patent is extended or adjusted under 35 U.S.C. 154(b) by 35 days.

This patent is subject to a terminal disclaimer.

(21) Appl. No.: 18/377,349

(22) Filed: Oct. 6, 2023

(65) Prior Publication Data

US 2024/0029531 A1    Jan. 25, 2024

Related U.S. Application Data

(63) Continuation of application No. 17/525,608, filed on Nov. 12, 2021, now Pat. No. 11,810,437, which is a
(Continued)

(51) Int. Cl.
*G08B 13/22* (2006.01)
*G08B 21/04* (2006.01)
(Continued)

(52) U.S. Cl.
CPC ......... *G08B 13/22* (2013.01); *G08B 21/0469* (2013.01); *G08B 25/008* (2013.01); *G08B 21/24* (2013.01)

(58) Field of Classification Search
CPC .. G08B 13/22; G08B 21/24; G08B 13/19645; G08B 25/008; G08B 25/009;
(Continued)

(56) References Cited

U.S. PATENT DOCUMENTS 5,315,285 A   5/1994 Nykerk
5,463,595 A   10/1995 Rodhall et al.
(Continued)

*Primary Examiner* — John A Tweel, Jr.
(74) *Attorney, Agent, or Firm* — Fish & Richardson P.C.

(57) ABSTRACT

Systems and techniques are described for an integrated security environment to monitor activities at a commercial facility and a residential facility. In some implementations, a monitoring system monitors a property that includes one or more sensors located at the property and generate sensor data. A monitor control unit receives and analyzes the sensor data. Based on analyzing the sensor data, the monitor control unit determines that an event has likely occurred at the property and generates data indicating that the event has likely occurred at the property. A monitoring server receives the data indicating the event has likely occurred at the property. Based on the data that the event has likely occurred at the property, transmitting, to an additional monitoring system that is configured to monitor an additional property, instructions for the additional monitoring system to perform an action.

20 Claims, 5 Drawing Sheets

Related U.S. Application Data continuation of application No. 16/871,276, filed on May 11, 2020, now Pat. No. 11,176,794, which is a continuation of application No. 15/942,137, filed on Mar. 30, 2018, now Pat. No. 10,650,652.

(60) Provisional application No. 62/478,887, filed on Mar. 30, 2017.

(51) Int. Cl.
*G08B 21/24* (2006.01)
*G08B 25/00* (2006.01)

(58) Field of Classification Search
CPC .. G08B 25/10; G08B 21/0469; G08B 25/002; F24F 11/30; F24F 11/56; G05B 15/02; G05B 19/2642
See application file for complete search history.

(56) References Cited

U.S. PATENT DOCUMENTS

| | | | |
|---|---|---|---|
| RE35,920 E | 10/1998 | Sorden et al. | |
| 6,591,094 B1 | 7/2003 | Bentley | |
| 6,727,811 B1 | 4/2004 | Fendis | |
| 7,009,497 B2 | 3/2006 | Nicoletti et al. | |
| 7,076,083 B2 | 7/2006 | Blazey | |
| 8,305,211 B1 | 11/2012 | Morris et al. | |
| 9,015,987 B2 | 4/2015 | Moran et al. | |
| 9,344,330 B2 | 5/2016 | Jacob et al. | |
| 9,384,607 B1 | 7/2016 | Copeland et al. | |
| 9,871,692 B1 | 1/2018 | Hutz | |
| 10,054,329 B1 | 8/2018 | Hutz et al. | |
| 10,055,582 B1 | 8/2018 | Weaver et al. | |
| 10,249,069 B1 | 4/2019 | Kerzner et al. | |
| 11,016,129 B1 | 5/2021 | Epard et al. | |
| 11,176,794 B1* | 11/2021 | Weingart | G08B 25/10 |
| 11,651,669 B2* | 5/2023 | Slavin | G08B 13/2402 |
| | | | 340/545.2 |
| 11,790,759 B2* | 10/2023 | Hutz | G08B 25/008 |
| | | | 340/506 |
| 11,810,437 B2* | 11/2023 | Weingart | G08B 25/008 |
| 2002/0027504 A1 | 3/2002 | Davis et al. | |
| 2004/0044493 A1 | 3/2004 | Coulthard | |
| 2004/0059438 A1 | 3/2004 | Sherlock | |
| 2004/0086089 A1 | 5/2004 | Naidoo et al. | |
| 2004/0140899 A1 | 7/2004 | Bouressa | |
| 2004/0189460 A1 | 9/2004 | Heaton et al. | |
| 2005/0137465 A1 | 6/2005 | Cuddihy et al. | |
| 2008/0042858 A1 | 2/2008 | Gabriel | |
| 2008/0106368 A1 | 5/2008 | Vitier | |
| 2008/0271123 A1 | 10/2008 | Ollis et al. | |
| 2013/0057384 A1 | 3/2013 | Jeffrey et al. | |
| 2013/0297175 A1 | 11/2013 | Davidson | |
| 2013/0304348 A1 | 11/2013 | Davidson et al. | |
| 2014/0266721 A1 | 9/2014 | Nickles et al. | |
| 2015/0347916 A1 | 12/2015 | Warren et al. | |
| 2017/0039476 A1 | 2/2017 | Eyring et al. | |
| 2017/0076584 A1 | 3/2017 | Eskildsen et al. | |
| 2017/0109983 A1 | 4/2017 | Flint et al. | |
| 2017/0213447 A1 | 7/2017 | Horrocks et al. | |
| 2017/0243472 A1 | 8/2017 | Davies et al. | |
| 2018/0211301 A1 | 7/2018 | Davies et al. | |
| 2024/0021067 A1* | 1/2024 | Madden | G08B 29/188 |

\* cited by examiner

200

```
┌─────────────────────────────────────────────────────────────┐
│ OBTAINING DATA FROM ONE OR MORE SENSORS IN A FIRST MONITORING│
│ SYSTEM                                                       │
│                                                          202 │
└─────────────────────────────────────────────────────────────┘
                              ↓
┌─────────────────────────────────────────────────────────────┐
│ BASED ON THE DATA FROM THE ONE OR MORE SENSORS, DETERMINING A│
│ CONFIDENCE SCORE THAT INDICATES A LIKELIHOOD THAT A PARTICULAR│
│ EVENT HAS OCCURRED                                       204 │
└─────────────────────────────────────────────────────────────┘
                              ↓
┌─────────────────────────────────────────────────────────────┐
│ COMPARING THE CONFIDENCE SCORE TO A PREDETERMINED            │
│ CONFIDENCE SCORE THRESHOLD                                   │
│                                                          206 │
└─────────────────────────────────────────────────────────────┘
                              ↓
┌─────────────────────────────────────────────────────────────┐
│ BASED ON COMPARING THE CONFIDENCE SCORE TO THE               │
│ PREDETERMINED CONFIDENCE SCORE THRESHOLD, DETERMINING        │
│ WHETHER TO PROVIDE, TO A SECOND MONITORING SYSTEM, DATA      │
│ INDICATING THAT THE PARTICULAR EVENT HAS LIKELY OCCURRED 208 │
└─────────────────────────────────────────────────────────────┘
```

```
RECEIVING, FROM A FIRST MONITORING SYSTEM, DATA INDICATING A
PRESENCE OF A USER AT A FIRST PROPERTY MONITORED BY THE FIRST
MONITORING SYSTEM                                            302
```

```
IN RESPONSE TO THE DATA INDICATING THE PRESENCE OF THE USER,
OBTAINING, FROM A SECOND MONITORING SYSTEM, DATA FROM ONE OR
MORE SENSORS LOCATED AT A SECOND PROPERTY MONITORED BY THE
SECOND MONITORING SYSTEM                                     304
```

```
DETERMINING THAT THE DATA FROM THE ONE OR MORE SENSORS DOES
NOT MATCH PREDETERMINED DATA THAT INDICATES A PARTICULAR
STATUS OF THE SECOND PROPERTY                                306
```

```
BASED ON DETERMINING THAT THE DATA FROM THE ONE OR MORE
SENSORS DOES NOT MATCH THE PREDETERMINED DATA, DETERMINING
WHETHER TO GENERATE, AND SEND TO THE USER, A NOTIFICATION
INDICATING THAT THE DATA FROM THE ONE OR MORE SENSORS DOES
NOT MATCH THE PREDETERMINED DATA                             308
```

```
RECEIVING, FROM A FIRST MONITORING SYSTEM, DATA INDICATING THAT
A USER IS EXITING A FIRST PROPERTY MONITORED BY THE FIRST
MONITORING SYSTEM                                          402
                          │
                          ▼
DETERMINING THAT THE USER IS LIKELY TRAVELING TO A SECOND
PROPERTY MONITORED BY A SECOND MONITORING SYSTEM
                                                           404
                          │
                          ▼
DETERMINING A TIME THAT THE USER IS EXPECTED TO ARRIVE AT THE
SECOND PROPERTY
                                                           406
                          │
                          ▼
PROVIDING, TO THE SECOND MONITORING SYSTEM, INSTRUCTIONS TO
ADJUST, BY THE EXPECTED ARRIVAL TIME, SYSTEMS AND DEVICES
LOCATED AT THE SECOND PROPERTY                             408
```

FIG. 4

CROSS SYSTEM SENSOR DATA CONTROL

CROSS-REFERENCE TO RELATED APPLICATIONS

This application is a continuation of U.S. application Ser. No. 17/525,608, filed Nov. 12, 2021, which is a continuation of U.S. application Ser. No. 16/871,276, filed May 11, 2020, which is a continuation of U.S. application Ser. No. 15/942,137, filed Mar. 30, 2018, which claims the benefit of U.S. Provisional Application No. 62/478,887 filed Mar. 30, 2017, and titled "Integrated Security for Multiple Access Control Systems." All of these prior applications are incorporated by reference in their entirety.

TECHNICAL FIELD

This specification relates generally to integrated security technology.

BACKGROUND

Home security includes the use of security hardware in place on a property as well as personal security practices. Typical domestic uses of home security includes detecting intrusion, detecting unlocked doors, and tripping alarms.

SUMMARY

The subject matter of the present disclosure is related to techniques for an integrated security environment to monitor activities at a commercial facility and a residential facility. Specifically, the integrated security environment includes a monitoring server and two control units, one control unit at each respective facility. The monitoring server monitors activity patterns for individuals at both facilities. The monitoring server performs the monitoring by communicating with the control units located at each facility. The monitoring server obtains sensory data from each of the control units in order to monitor and learn activity patterns for individuals at each facility. As a result, the monitoring server can notify an individual of events at the residential facility while the individual is at the commercial facility based on actions of the individual at the commercial facility, and vice versa. For example, a user, John, may badge into the commercial facility and subsequently receive a notification on his client device from the monitoring server informing John that he forgot to shut his garage door when he left the residential facility.

In some implementations, the monitoring server may notify other individuals at the commercial facility based on an activity pattern of an individual at the residential facility. For example, John may securely arm his home for detection of intruders before John leaves for work at 8:55 AM. The monitoring server may determine that John leaves for the commercial facility based on one or more factors obtained from the sensory data, the day of week, and the time of day. However, the monitoring server has learned that John's commute time to the commercial facility is 25 to 30 minutes. In addition, the monitoring server knows that the commercial facility opens at 9:00 AM. Due to these factors, the monitoring server knows John will be late to the commercial facility. In response, the monitoring server can transmit a notification alert to John's boss, Dave, notifying that John will be late to the commercial facility. In this instance, the monitoring server may also transmit a notification to Dave when John badges in at the commercial facility, making Dave aware of John's arrival at the commercial facility.

In one general aspect, a method is performed by one or more computers of a monitoring system. The method includes: receiving, from one or more sensors of a monitoring system that is configured to monitor a property, sensor data; analyzing, by the monitoring system, the sensor data; based on analyzing the sensor data, determining, by the monitoring system, that an event has likely occurred at the property; and based on determining that the event has likely occurred at the property, transmitting, to an additional monitoring system that is configured to monitor an additional property, instructions for the additional monitoring system to perform an action.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

Implementations may include one or more of the following features. For example, in some implementations, based on analyzing the sensor data, determining, by the monitoring system, a confidence score that indicates a likelihood that the event has occurred; comparing, by the monitoring system, the confidence score to a confidence threshold; and based on comparing the confidence score to the confidence threshold, determining, by the monitoring system, that the confidence score satisfies the confidence threshold, wherein determining that the event has likely occurred at the property is based further on determining that the confidence score satisfies the confidence threshold.

In some implementations, the method further comprises determining, by the monitoring system, that the event has likely occurred at the property comprises determining that a person has left the property and is likely going to the additional property, generating, by the monitoring system, the data indicating that the event has likely occurred at the property comprises generating data indicating that the person has left the property and is likely going to the additional property, receiving, by the monitoring system, the data indicating that the event has likely occurred at the property comprises receiving the data indicating that the person has left the property and is likely going to the additional property, and transmitting, by the monitoring system, the instructions for the additional monitoring system to perform the action comprises transmitting an instruction for the additional monitoring system to prepare the additional property for the person to the additional monitoring system.

In some implementations, the method further comprises determining, by the monitoring system, environmental conditions of the property before the person has likely left the property, wherein transmitting, by the monitoring system, an instruction for the additional monitoring system to prepare the additional property for the person comprises transmitting an instruction for the additional monitoring system to change additional environmental conditions of the additional property to match the environmental conditions of the property.

In some implementations, the method further comprises wherein the environmental conditions include an ambient temperature, music playing, and lighting style.

In some implementations, the method further comprises wherein determining that the person has left the property and is likely going to the additional property comprises: determining, by the monitoring system, that the monitoring system received an instruction to arm within a predetermined time range; and determining, by the monitoring system, that a person exited the property during the predetermined time range.

In some implementations, the method further comprises receiving, by the monitoring system, data indicating traffic conditions; determining, by the monitoring system, that the person is likely going to arrive at the additional property after an expected arrival time based on the data indicating the traffic conditions; generating, by the monitoring system, data indicating that the person is likely going to arrive at the additional property after the expected arrival time; receiving, by the monitoring system, the data indicating that the person is likely going to arrive at the additional property after the expected arrival time; and transmitting, by the monitoring system, an instruction for the additional monitoring system to output a notification indicating that the person is likely going to arrive at the additional property after the expected arrival time.

In some implementations, the method further comprises determining, by the monitoring system, that the event has likely occurred at the property comprises determining that a particular person is likely at the property, transmitting, by the monitoring system, instructions for the additional monitoring system to perform an action comprises transmitting instructions to determine whether the particular person is likely at the additional property, and the method comprises: receiving, by the monitoring system, data indicating that the particular person is likely at the additional property; and providing, by the monitoring system, data indicating a security event at the property or the additional property for output.

In some implementations, the method further comprises determining, by the monitor control unit, that an event has likely occurred at the property by determining that a particular person has likely arrived at the property, and transmitting, by the monitoring server, instructions for the additional monitoring system to perform an action by transmitting instructions to determine a portion of the additional property is in a particular state.

In some implementations, the method further comprises wherein transmitting, by the monitoring server, the instructions to determine the portion of the additional property is in the particular state by transmitting an instruction to determine whether a particular door is locked.

In some implementations, the method further comprises wherein transmitting, by the monitoring server, the instructions to determine the portion of the additional property is in the particular state by transmitting an instruction to determine that a garage door is closed.

In some implementations, the method further comprises wherein transmitting, by the monitoring server, the instructions to determine the portion of the additional property is in the particular state by transmitting an instruction to determine whether the additional monitoring system is armed.

BRIEF DESCRIPTION OF THE DRAWINGS

FIGS. 2 and 3 are flowcharts of example processes for providing an alert based on a determination that a particular event has occurred.

FIG. 4 is a flowchart of an example process for providing instructions to a second monitoring system based on a user's departure from a first monitoring system and an expected arrival time at the second monitoring system.

DETAILED DESCRIPTION

Figure 1:
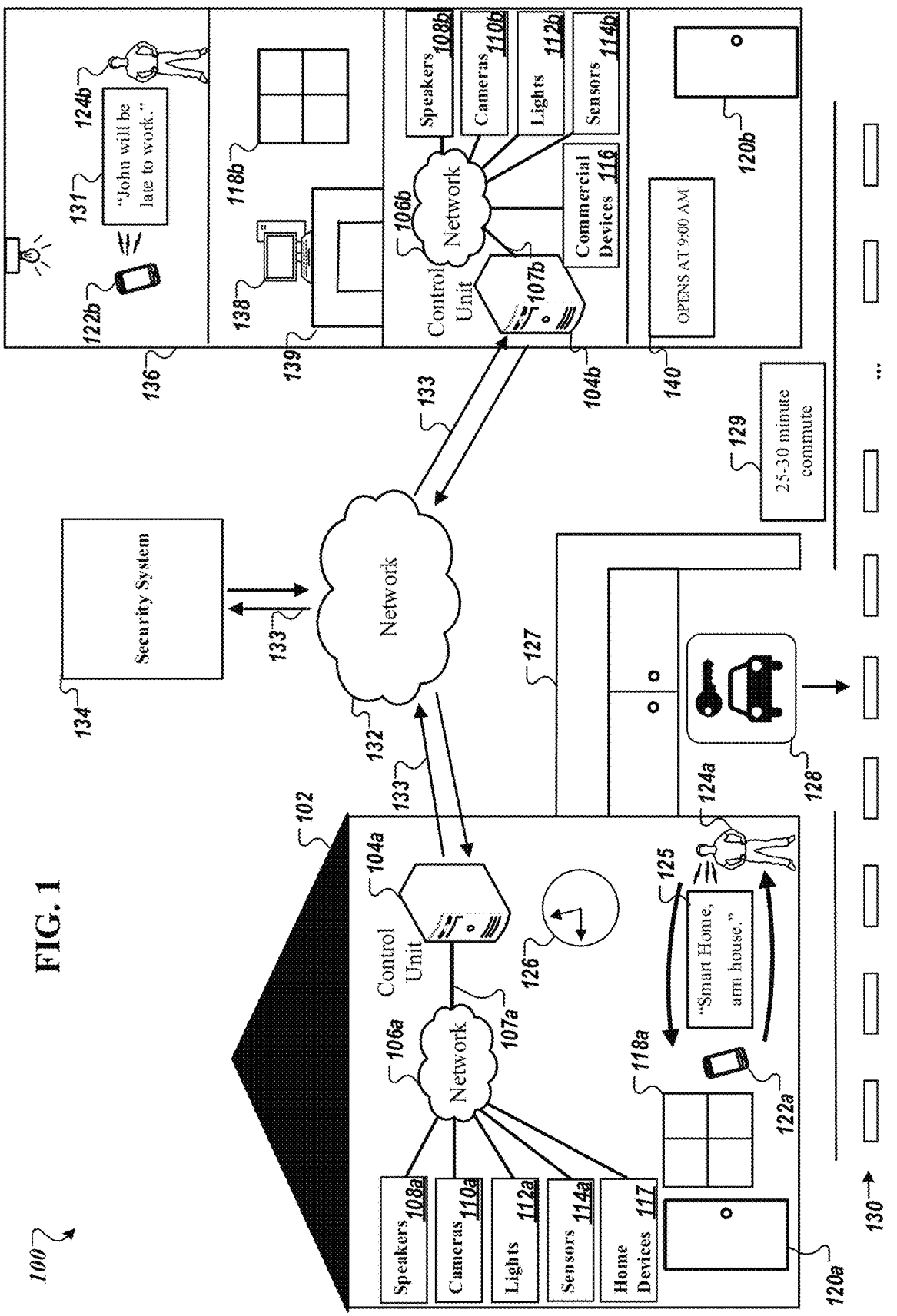
FIG. 1 is a contextual diagram of an example system of an integrated security environment for monitoring control units of residential and commercial facilities.

FIG. 1 is a contextual diagram of an example system 100 of an integrated security environment for monitoring control units of residential and commercial facilities. Though system 100 is shown and described including particular set of components including a control unit 104a-b, network 106a-106b, speakers 108a-108b, cameras 110a-110b, lights 112a-112b, sensors 114a-114b, commercial devices 116, home devices 117, network 132, communication links 133, monitoring server 134, the present disclosure need not be so limited. For instance, in some implementations only a subset of the aforementioned components may be used by the integrated security environment for monitoring the controls units of the residential and the commercial facilities. As an example, there may be implementations that do not use the speakers 108a-108b. Similarly, there may be implementations that the monitoring server 134 is separated into two monitoring servers stored in each control unit 104a and control unit 104b. Yet other alternative exemplary systems also fall within the scope of the present disclosure such as a system that does not use a control unit server 104a. For these reasons, the system 100 should not be viewed as limiting the present disclosure to any particular set of necessary components.

As shown in FIG. 1, a residential facility 102 (e.g., a home) of a user 124a is monitored by a control unit server 104a that includes components within the residential facility 102. The components within the residential facility 102 may include one or more speakers 108a, one or more cameras 110a, one or more lights 112a, one or more sensors 114a, and one or more home devices 117. The one or more cameras 110a may include video cameras that are located at the exterior of the residential facility 102 near the front door 120a and the garage door 127, as well as located at the interior of the residential facility 102 near the front door 120a. The one or more sensors 114a may include a motion sensor located at the exterior of the residential facility 102, a front door sensor that is a contact sensor positioned at the front door 120a, a garage door sensor that is a contact sensor positioned at the garage door 127, and a lock sensor that is positioned at the front door 120a and each window 118a. The contact sensor may sense whether the front door 120a, the garage door 127, or the window 118a is in an open position or a closed position. The lock sensor may sense whether the front door 120a and each window 118a is in an unlocked position or a locked position. The one or more home devices 117 may include home appliances such as a washing machine, a dryer, a dishwasher, an oven, a stove, a microwave, and a laptop, to name a few examples.

The control unit server 104a communicates over a short-range wired or wireless connection over network 106a with connected devices such as each of the one or more speakers 108a, one or more cameras 110a, one or more lights 112a, one or more home devices 117 (washing machine, a dryer, a dishwasher, an oven, a stove, a microwave, a laptop, etc.), and one or more sensors 114a to receive sensor data descriptive of events detected by the one or more speakers 108a, the one or more cameras 110a, the one or more lights 112a, and the one or more home devices 117 in the residential facility 102. In some implementations, the connected devices may connect via Wi-Fi, Bluetooth, or any other protocol used to communicate over network 106a to the control unit server 104a. Additionally, the control unit server 104a communicates over a long-range wired or wireless connection with a monitoring server 134 over network 132 via communication links 133. In some implementations, the monitoring server 134 is located remote from the residential facility 102, and manages the monitoring at the residential facility 102, as well as other (and, perhaps, many more) monitoring systems located at different properties that are owned by different users. In other implementations, the monitoring server 134 is located locally at the monitored residential facility 102. The monitoring server 134 communicates bi-directionally with the control unit server 104a. Specifically, the monitoring server 134 receives sensor data descriptive of events detected by the sensors included in the monitoring system of the residential facility 102. Additionally, the monitoring server 134 transmits instructions to the control unit server 104a for particular events.

System 100 further includes a commercial facility 136 that includes similar components to residential facility 102 with similar functionality. Specifically, the commercial facility 136 includes a control unit server 104b, network 106b, one or more speakers 108b, one or more cameras 110b, one or more lights 112b, one or more commercial devices 116 (a printer, a copier, a vending machine, a fax machine, etc.), and one or more sensors 114b to receive sensor data descriptive of events detected by the one or more speakers 108b, the one or more cameras 110b, the one or more lights 112b, and the one or more commercial devices 116. Like control unit server 104a, control unit server 104b communicates over a short-range wired or wireless network over network 106b with the connected devices. Additionally, the control unit server 104b bi-directionally communicates over a long-range wired or wireless connection with the monitoring server 134 over network 132 via communication links 133.

In the example shown in FIG. 1, user 124a may prepare to leave for the commercial facility 136 (e.g., work) from the residential facility 102 (e.g., home). In doing so, the user 124a may turn off each of the one or more lights 112a, turn off each of the one or more home devices 117, lock the front door 120a, and close and lock each of the one or more windows 118a. In some implementation, the user 124a may interact with a client device 122a to activate a signature profile, such as "arming home" for the residential facility 102. The client device 122a may display a web interface, an application, or a device specific for a smart home system. The client device 122a can be, for example, a desktop computer, a laptop computer, a tablet computer, a wearable computer, a cellular phone, a smart phone, a music player, an e-book reader, a navigation system, a security panel, or any other appropriate computing device. In some implementations, the client device 122a may communicate with the control unit server 104a using the network 106a and one or more communication links 107. The network 106a may be wired or wireless or a combination of both and can include the Internet.

In some implementations, user 124a may communicate with the client device 122a to activate a signature profile for the residential facility 102. To illustrate, user 124a may first instruct the control unit server 104a to set a signature profile associated with arming the residential facility 102. For example, user 124a may use a voice command 125 to say "Smart Home, arm house," as shown in FIG. 1. The voice command 125 may include a phrase, such as "Smart Home" to trigger the client device 122a to actively listen to a command following the phrase. Additionally, the phrase "Smart Home" may be a predefined user configured term to communicate with the client device 122a. The client device 122a can send the voice command to the control unit server 104a over the network 106a, and the one or more communication links 107a. The control unit server 104a may notify the monitoring server 134 that residential facility 102 is to be armed. In addition, the control unit 104a may set associated parameters in response to receiving the voice command. Moreover, the control unit 104a can send back a confirmation to the client device 122a in response to arming the residential facility 102 and setting the associated parameters. For example, the control unit server 104a may send back a response to display a message on the client device 122a that says "Smart Home, home armed."

In some implementations, in order for the control unit server 104a to allow user 124a and others to activate a signature profile case for the residential facility 102, the user 124a and others may define and store signature profiles in the control unit 104a. In other implementations, the user 124 and others may define and store signature profiles in the monitoring server 134. The signature profile may be associated with each user and allow for various use cases of the devices in the residential facility 102. Each of the signature profiles can be associated with one user, such as user 124a. For example, user 124a may create a signature profile for arming the residential facility 102.

In some implementations, user 124a may store one or more parameters associated with a use case in his or her signature profile. Specifically, the one or more parameters for each use case may describe a specific song to be played when activating a use case, a volume level in decibels (dB) of the speakers 108a, an aperture amount for the cameras 110a, a brightness intensity level of the lights 112a, turning on home devices 117 such as television, laptop, one or more fans, setting a specific temperature of a thermometer, opening or closing the shades of window 118a a particular amount, and any other parameters to describe the use case. For example, user 122a may create a signature profile with a use case for "end of day celebration". The user 124a may define the one or more parameters to play the song "Happy" by Pharrell Williams, with a volume level of −3 dB for the one or more speakers 108a, an aperture of f/16 for the one or more cameras 110a, 1100 lumens brightness for the one or more lights 112a, turning on a television, a laptop, no fans, setting the thermometer to 68 degrees Fahrenheit, and fully opening the blinds of the one or more windows 118a.

In this implementation, the control unit server 104a can set the parameters associated with "arming the home." Specifically, the one or more parameters for "arming the home" may include no song to play, a volume level of 0 dB for the speakers 108a, an aperture of f/16 for the one or more cameras 110a, zero lumens for the one or more lights 112a, turning off a television, turning off a laptop, no fans, setting the thermometer to 67 degrees Fahrenheit, and fully closing the blinds of the one or more windows 118a. Additionally, the control unit server 104a increases the sensitivity associated with each of the one or more sensors 114a for the "arming the home" use case. Specifically, control unit server 104a may increase the sensitivity for the front door sensor, the garage door sensor, and the lock sensor by a predetermined factor so that smaller movements of the front door or garage door trigger an alarm event. For example, the sensitivity may be increased by a factor of five.

In some implementations, the control unit server 104*a* may send a response to display a message on the client device 122*a* that says "Smart Home, home armed" once the control unit server 104*a* sets the parameters. In addition, the control unit server 104*a* transmits a message to the monitoring server 134 that the residential facility 102 finished arming. At this point, the user 124*a* may get in vehicle 128 and drive to the commercial facility 136 down roadway 130. The monitoring server 134 learns the commute time from the resident facility 102 to the commercial facility 136 is 25-30 minutes (129) based on past trips taken by the user 124*a*. In other implementations, the monitoring server 134 may determine traffic conditions along the road 130 by checking web sites that list current road conditions. Specifically, the monitoring server 134 learns the commute time 129 based on a date and time associated with when the user 124*a* leaves the resident facility 102 with a date and time associated with when the user badges in at commercial facility 136.

In some implementations, the commercial facility 136 may be equipped with a sensor on the exterior of the front door 120*b*. Specifically, the sensor may allow user 124*a* to scan a badge or a QR code to gain access into the commercial facility 136. The control unit server 104*b* may receive scanned badge data or the QR code from the one or more sensors 114*b*. In response, the control unit server 104*b* then communicates the scanned badge data or the QR code to the monitoring server 134. The monitoring server 134 may compare the scanned badge data or QR code against a list of one or more codes associated with users allowed access to the commercial facility 136 and authenticate entry via front door 120*b* once there is a match. In addition, the monitoring server 134 logs an entry of a user along with the date and time once the monitoring server 134 determines a match.

For example, the monitoring server 134 may log an entry associated with the user 124*a* arming the residential facility 102 and shutting the garage door 127 every weekday at 8:30 AM, denoting the user 124*a*'s departure. Twenty-five minutes later at 8:55 AM, the monitoring server 134 receives a notice that user 124*a* badges in at the commercial facility 136 to gain entry into door 120*b*. The monitoring server 134 may recognize a pattern based on similar activity of the user 124*a* between the residential facility 102 and the commercial facility 136. As a result, the monitoring server 134 logs an entry in memory that the user 124*a* travels from the residential facility 102 to the commercial facility 136 every Monday through Friday and the travel time is 25-30 minutes.

In this implementation, the monitoring server 134 can learn that the commercial facility 136 opens daily at 9:00 AM. Specifically, the monitoring server 134 receives a notification at 9:00 AM daily that the door 120*b* has been unlocked. In other implementations, the monitoring server 134 may receive an input from a user that describes an opening time and a closing time of commercial facility 136. For example, user 124*a* may enter the opening and closing times of the commercial facility 135 into a smart home application on the client device 122*a*. The smart home application transmits the opening and closing times to the monitoring server 134 for storing and tracking.

In some implementations, the monitoring server 134 may correlate learned data with received input data of a particular situation. For example, the monitoring server 134 may receive notice that user 124*a* arms residential facility 102 and shuts garage door 127, at a time of 8:55 AM from the control unit 104*a*. The monitoring server 134 may correlate the received notice with the learned data to produce a triggered event, e.g., the time it takes for user 124*a* to commute to the commercial facility 136, that the user 124*a* is not leaving the residential facility 102 on time. For example, the monitoring server 134 may determine user 124*a* will arrive at the commercial facility 136 at a time of 9:20 AM, twenty minutes past the opening time of the commercial facility 136. In response to determining the triggered event, the monitoring server 134 may generate a message to send to client device 122*b* of user 124*b*, who may be the boss of user 124*a*, notifying of user 124*a*'s anticipated tardiness. For example, the message sent to the client device 122*b* may display "John will be late to work" 131. In addition, the monitoring server 134 may communicate to user 124*a* of his or her late arrival time to work. In some implementations, the monitoring server 134 may notify user 124*b* of user 124*a*'s arrival upon a determination that the control unit server 104*b* determined a badged entry of user 124*a* at door 120*b*. For example, the monitoring server 134 may receive a notification of user 124*a*'s badged entry at door 120*b* and send a message to the client device 122*b* to display "John has arrived at work."

In some implementations, the functionality described in FIG. 1 is not restricted to instances when user 124*a* is late to work. For example, the monitoring server 134 may receive notice that user 124*a* arms residential facility 102 and drives vehicle 128 towards the commercial facility 136. The monitoring server 134 may produce a triggered event that the user 124*a* left the garage door 127 door open. In response, the monitoring server 134 may transmit a notification to the client device 122*a* saying "Garage Door Left Open." The user 124*a* may log into the application on the client device 122*a* and instruct the application to close the garage door 127. Specifically, the application on the client device 122*a* may indicate a button for the user to press to close the garage door 127. The client device 122*a* may send a message to the control unit 104*a* through the control unit 104*b* over the network 132. The control unit 104*a* may close the garage door 127 in response to receiving the instruction. Afterwards, the monitoring server 134 may allow access to user 124*a*'s badged entry to front door 120*b*. In other implementations, the monitoring server 134 may send a message to the control unit 104*b* to close the garage door 137 in response to user 124*a*'s badged entry to front door 120*b*. In other implementations, the monitoring server 134 can notify user 124*a*'s client device 122*a* of other functions such as, one or more windows 118*a* remained open, the front door 120*a* remained open or unlocked, the residential facility 102 remained unarmed when the user 124*a* left, or any of the one or more home devices 117 remained on in response to user 124*a*'s badged entry to front door 120*b*.

In some implementations, the functionality described in FIG. 1 is not restricted to any of the aforementioned examples above. For example, user 124*a* may utilize a badge such as an identification (ID) badge with near field communication (NFC) abilities to gain entry into front door 120*b* of commercial facility 136. The client device 122*a* may also be used to badge into the front door 120*b* of the commercial facility 136. As the user 124*a* exits the commercial facility 136, the user 124*a* badges out using the client device 122*a*, while the user 124*a*'s badge remains on the user 124*a*'s desk 139. The user 124*a* drives to residential facility 102 and disarms residential facility 102 upon entry into the front door 120*a*. Upon disarming residential facility 102, the control unit 104*a* transmits a notification to the monitoring server 134 alerting of the disarmed residential facility 102.

However, the monitoring server 134 determines the user 124a's ID badge is located in the commercial facility 136. In some implementations, the control unit 104b may employ a secondary wireless protocol that can transmit beacon messages to employees utilizing a "badge monitor" application on client devices 122. The beacon messages can identify employees utilizing the "badge monitor" application and in response, the "badge monitor" application can communicate a location of badges (e.g., client devices 122) and associated users back to the control unit 104b and to the monitoring server 134. In some implementations, the commercial facility 136 may require users to badge out when exiting the front door 120b. Additionally, the commercial facility 136 may require users to badge in between spaces, such as rooms, within the facility. Thereby, the control unit 104b and the monitoring server 134 track the user's badge as it moves from one room to the next and exits from the commercial facility 136. Upon determining the ID badge is still located at the commercial facility 136, the monitoring server 134 may transmit a notification to the client device 122a alerting the user 124a of presence at both residential facility 102 and commercial facility 136. In order to alleviate this issue, the user 124a may remove the badge from the commercial facility 136 or the control unit 104a may temporarily deactivate the ID badge of user 124a.

In some implementations, the functionality described in FIG. 1 is not restricted to any of the aforementioned examples above. For example, user 124a may desire to know the location of his or her spouse and when the spouse departs from work (commercial facility 136). In this scenario, user 124a can be located at residential facility 102. User 124a's spouse, referred herein as Jane, may be leaving work, such as commercial facility 136. The monitoring server 134 may receive badged input from Jane in response to Jane badging out at a badged sensor at work. The monitoring server 134 can determine from Jane's signature profile that the monitoring server 134 must send a notification to Jane's house, such as residential facility 102, upon a determination that Jane has badged out at work. The notification may indicate to the control unit server 104a to send an audio signal to play out of the one or more speakers 108a, a visual signal such as a flashing green light out of the one or more lights 112a, or a text message to the client device 122a, or any combination of these. The control unit server 104a may notify user 124a of Jane's badged out from work in one or more notifications. Specifically, if the notification is an auditory message, the control unit server 104a can play the auditory message out of the one or more speakers 108a. For example, Jane may have defined a song in her signature profile such as Happy by Pharrell Williams in which the control unit 104a plays out of the one or more speakers 108a upon a determination that Jane has badged out of work. If the notification is a visual message, the control unit server 104a may change the color of the one or more lights 112a and brighten the bulbs of the one or more lights 112a. For example, the control unit server 104a may change the color of the one or more lights 112a to green and brighten the bulbs. If the notification is a text message, the control unit server 104a may transmit a message to client device 122a that displays "Jane has left work". In some implementations, all of the following notifications methods may be used. Alternatively, these same notifications may be applied when a user, such as user 124a, leaves residential facility 102 for commercial facility 136. In other implementations, the monitoring server 134 may issue other notifications to control unit server 104b to alert user 124a's boss, user 124b, that user 124a has left the residential facility 102 for work upon a determination of one or more events. For example, the monitoring server 134 may determine one or more events such as user 124a has armed the residential facility 102, closed the garage door 127, and car 128 has driven away from residential facility 102. The monitoring server 134 may issue other notifications such as an email or a text message to user 124b, user 124a's boss, for alerting.

In some implementations, the functionality described in FIG. 1 is not restricted to any of the aforementioned examples above. For example, user 124a may desire to know when the commercial facility 136 (e.g., his business) opens/closes by an employee. User 124a may create a signature profile in the monitoring server 134 to remind the user via an auditory, visual, or text message notification when his or her business opens/closes. For example, user 124a may edit the signature profile for reminding his or herself when the business opens/closes. Specifically, the business may open at 9:00 AM and close at 5:00 PM Monday through Friday. However, the monitoring server 134 may further require front door 120b to be unlocked by an employee in order to signal the opening of the business and require front door 120b to be locked in order to signal the closing of the business. Therefore, the monitoring server 134 can identify a time-criteria has been met and the front door has been either unlocked or locked by an employee before notifying user 124a that business 136 is either opened or closed, respectively. Alternatively, these same rules and conditions may be applied when residential facility 102 is locked or unlocked, with or without the time criteria. As mentioned above, the monitoring server 134 may transmit notifications for the commercial facility 136 to the control unit server 104a and the notifications for the residential facility 102 to the control unit server 104b.

In some implementations, the functionality described in FIG. 1 is not restricted to any of the aforementioned examples above. For example, user 124a may desire to know when particular events occur in the residential facility 102 that indicate a likelihood when his or her family enters the residential facility 102. User 124a may create a signature profile in the monitoring server 134 to remind the user via an auditory, visual, or text message notification when the family enters the residential facility 102. For example, user 124a may edit the signature profile for issuing one or more notifications in response to a disarmed system, an unlocked front door 120a, and one or more home devices 117 turned on indicating the likelihood that his or her family has arrived at the residential facility 102. Additionally, the user 124a may define a time criterion, such as every weekday at 4:30 pm, in which user 124a's children return from school, to ensure the notifications are not redundant for each instance in which an individual disarms the house 102, unlocks the front door 120a, and turns on one or more home devices 117.

In some implementations, a notification issued to user 124a may be associated with a specific home device 117. For example, if user 124a's son disarms the resident facility 102, unlocks the front door 120a, and turns on the microwave to heat food, the monitoring server 134 may issue a text message to user 124a's client device 122a stating, "Microwave turned on." Alternatively, the monitoring server 134 may issue a beeping sound through the one or more speakers 108b to denote a user turned on the microwave. In order to limit the frequency of the notifications to user 124a regarding an individual activating one or more home devices 117, the monitoring server 134 may wait a predetermined amount of time before issuing another notification. For example, the monitoring server 134 may issue one notification to user 124a regarding a first time a user turns on the microwave.

Next, the monitoring server 134 may ignore any further microwave activity for the next hour. After the following hour, user 124*a* may receive notification of the next time an individual activates the microwave. Additionally, the user 124*a* may request to know how many times users turned on the microwave during the predetermined amount of ignored time. The monitoring server 134 can transmit a message regarding a number of times users turned on the microwave during the inactivation notification period.

In some implementations, the functionality described in FIG. 1 is not restricted to any of the aforementioned examples above. For example, user 124*a* may desire a particular environment at the residential facility 102 upon the user 124*a*'s departure from the commercial facility 136. User 124*a* may create a signature profile in the monitoring server 134 of a pre-arrival environment at either the residential facility 102 or the commercial facility 136. For example, user 124*a* may edit the signature profile for generating a pre-arrival environment with music playing out of the one or more speakers 108*a*, the one or more lights 112*a* set to medium brightness, a thermostat set to 71 degrees F., and a television tuned to channel 50 for ESPN. At the commercial facility, a pre-arrival environment may be defined in the signature profile to play music at quiet volume out of the one or more speakers 108*b*, the one or more lights 112*b* set to a high brightness, a thermostat set to 71 degrees F., a motorized desk adjusted to a particular height, and a desk light turned on at a particular brightness. The monitoring server 134 may set this signature profile at a location based on a determination that user 124*a* has departed the other location. For example, if user 124*a* turns on the signature profile to set a pre-arrival environment via his/her client device 122*a*, the user 124*a* arms the residential facility 102*a*, and the user 124*a* drives car 128 away after closing the garage door 127, the monitoring server 134 may notify the control unit server 104*b* to set the pre-arrival environment settings at the commercial facility 136. In some implementations, the monitoring server 134 notifies the control unit server 104*b* to set the pre-arrival environment settings at an estimated arrival time of the user 124*a*. In other implementations, the monitoring server 134 notifies the control unit server 104*b* to set the pre-arrival environment settings immediately following a notification that user 124*a* has departed the residential facility 102. By setting the pre-arrival environment settings early, the one or more lights 112*b*, the thermometer, and the one or more commercial devices 116 have time to adjust the environment before user 124*a* arrives. Alternatively, this situation may be applied to setting a pre-arrival environment upon a determination that user 124*a* has departed the commercial facility 136 via badging out, arming the commercial facility 136, or any type of geo-service which tracks user 124*a*'s [124'*a*] client device 122*a*.

In some implementations, the functionality described in FIG. 1 is not restricted to any of the aforementioned examples above. For example, the monitoring server 134 may not require user 122*a* to swipe a badge to gain entry to the front door 120*b* of commercial facility 136. The monitoring server 134 may utilize one or more sensors to automatically open the front door 120*b*. Specifically, the control unit server 104*a* may transmit a notification to the monitoring server 134 when user 122*a* arms his residential facility 102, shuts his garage door 127, and drives his car 128 away from residential facility 102. Additionally, car 128 may be equipped with a car sensor, which transmits a Global Positioning Systems (GPS) locational coordinates to the monitoring server 134 at pre-determined intervals. For example, the pre-determined intervals may be every 30 seconds. The monitoring server 134 can determine a destination of user 124*a* based on the GPS locational coordinates, whether residential facility 102 is armed, and date/time of day. For example, if the monitoring server 134 determines the GPS locational coordinates of user 124*a*'s car 128 is moving down road 130 towards commercial facility 136, the residential facility 102 is armed, and the day is Monday at 8:00 am. In response to these determinations, the monitoring server 134 may authenticate the user 124*a* at front door 120*b* in methods that do not require badging. Specifically, the monitoring server 134 may turn on facial recognition at front door 120*b* in response to turning on tracking of car 128. For example, the monitoring server 134 may perform facial recognition of user 124*a* as the user 124*a* approaches front door 120*b* in response to the monitoring server 134 tracking car 128. In response to determining the results of the facial recognition match stored facial characteristics of user 124*a*, the monitoring server 134 automatically opens front door 120*b*.

In some implementations, the functionality described in FIG. 1 is not restricted to any of the aforementioned examples above. For example, user 124*a* may desire matched preferences between an environment of the commercial facility 136 and an environment of the residential facility 102. User 124*a* may create a signature profile in the monitoring server 134 of a matched environment to use at both the residential facility 102 and the commercial facility 136. For example, user 124*a* may edit the signature profile for generating a match environment with music playing out of the one or more speakers 108*a*, the one or more lights 112*a* set to a particular brightness, a thermostat set to a particular temperature, and a television tuned to a particular channel. The monitoring server 134 can ensure the same settings apply to both facilities. The monitoring server 134 may set this signature profile at both locations based on a determination that user 124*a* has departed the other location and/or a request made by the user 124*a* to match environment preferences. For example, if user 124*a* turns on the signature profile to set a matched environment via his/her client device 122*a*, the monitoring server 134 may retrieve the current settings of the environment in the location left by user 124*a*, such as the commercial facility 136, from the control unit server 104*b* and transfer the obtained settings to the control unit server 104*a* at the residential facility 102. In response to receiving the obtained settings at the control unit server 104*a*, the control unit server 104*a* may set the one or more speakers 108*a*, the one or more cameras 110*a*, the one or more lights 112*a*, the one or more home devices 117, and the one or more sensors 114*a* to match the obtained settings. For example, the monitoring server 134 may continue playing the song at the residential facility 102 that was playing at the commercial facility 136 when the user 122*a* left. In another example, the monitoring server 134 may enable keypads to use the same pin-codes when enabling the matched environment signature profile. In some implementations, the control unit server 104*a* sets the devices to the obtained settings upon a determination that user 124*a* disarms residential facility 102 and unlocks the front door 120*a*. In other implementations, the control unit server 104*a* sets the devices to the obtained settings immediately following the request made by the user 124*a* to enable the matched environment signature profile.

FIG. 2 is a flowchart of an example process 200 for providing an alert based on a determination that a particular event has occurred. Generally, the process 200 includes obtaining data from one or more sensors at a first monitoring system; based on the data from the one or more sensors, determining a confidence score that indicates likelihood that a particular event has occurred; comparing the confidence score to a predetermined confidence score threshold; and, based on comparing the confidence score to the predetermined confidence score threshold, determining whether to provide, to a second monitoring system, data indicating that the particular event has likely occurred.

During 202, the control unit server 104a obtains data from one or more sensors 114a in a first monitoring system. In some implementations, the control unit server 104a obtains data from the motion sensor located at the exterior of the residential facility 102, the front door sensor that is a contact sensor positioned at the front door 120a, the garage door sensor that is a contact sensor positioned at the garage door 127, and/or a lock sensor that is positioned at the front door 120a and each window 118a is in an unlocked position or a locked position. Additionally, the control unit server 104a may obtain sensor data from the one or more home devices 117. The data from the one or more sensors 114a may include a status signal associated with each one of the sensors denoting a triggered action. Specifically, each of the signals denotes an indication that an event associated with the sensor has occurred. For example, if the lock sensor returned a high status signal, then the lock associated with a device, such as front door 120a, is locked. In another example, if the contact sensor returned a low status signal, then the contact sensor associated with the garage door 127 is not in contact with the garage door 127 because the garage door 127 is open. Each of the one or more sensors 114a and the one or more home devices 117 may return a status of high or low. The control unit server 104a can determine an event associated with the low or high signal, such as a lock being unlocked or locked, respectively.

During 204, the control unit server 104a determines a confidence score that indicates a likelihood that a particular event has occurred based on the data obtained from the one or more sensors 114a and the one or more home devices 117. In some implementations, the control unit server 104a may sum the obtained data from the one or more sensors 114a and the one or more home devices 117 to determine the confidence score. The sum of the obtained data may include the sum of the status signals of each of the one or more sensors 114a and the one or more home devices 117. For example, the sum of the obtained data may be 50, which includes all of the status signals from each of the sensors and home devices. The control unit server 104a determines the confidence score from the sum of the status signals. For example, if 100 home devices 117 and sensors 114a exist in the residential facility 102, then a confidence score of 100 may mean every home device 117 and sensor 114a is in the locked, closed, in the contact position, or functioning properly in residential facility 102. This event could correspond to the residential property 102 being armed and user 124a not being in the residential facility 102. In other implementations, a confidence score of 80 may mean two devices out of 100 devices in the one or more home devices 117 and the one or more sensors 114a are in the unlocked, opened, non-contact position, or not functioning properly while the other 98 devices are in the locked closed, in the contact position, or functioning properly. This event could correspond to the garage door 127 being left open and the front door 120a being unlocked.

During 206, the control unit server 104a compares the determined confidence score to a predetermined confidence score threshold. In some implementations, the control unit server 104a compares the determined confidence score to the predetermined confidence score threshold to determine if a particular event has occurred. Continuing with the example above, the determined confidence score may be 80 and the predetermined confidence score threshold may be 75, indicating a likelihood that the user 124a is likely not at the residential facility 102. In a different example, if the confidence score was below 75, then the control unit 104a may determine that the user 124a is likely at the residential facility 102.

During 208, the control unit server 104a determines whether to provide, to a second monitoring system, data indicating that the particular event has likely occurred based on comparing the confidence score to the predetermined confidence score threshold. In some implementations, the control unit server 104a provides data to the second monitoring system, such as the control unit server 104b, based on the indication that the particular event has occurred, for example, user 124a likely not being at the residential facility 102. The control unit 104b may, knowing that user 124a is likely not at the residential facility 102, activate the user 124a's ID badge. In this instance, the user 124a may gain access to the commercial facility 136. In addition, the control unit server 104a may also provide data to one or more client devices (122a or 122b) based on preferences set in a signature profile associated with a user, such as user 124a. Continuing with the example mentioned above where user 124a left the garage door 127 and the front door 120a open, the control unit server 104a determined user 124a is likely not at the residential facility 102. As a result, the control unit server 104a may send a notice to the monitoring server 134 that residential facility 102 is armed, the vehicle 128 has driven away, yet the user left open garage door 127 and front door 120a. In response, the monitoring server 134 may transmit a notification to user 124a's client device 122 to notify that one or more home devices remained open. Specifically, the monitoring server 134 may transmit a notification to the client device 122a saying "Garage Door Left Open" or "Front Door Left Open" or "One or more home devices unlocked." In order to alleviate this issue, the user 124a may log into the application on the client device 122a and instruct the application to close the garage door 127.

FIG. 3 is a flowchart of an example process 300 for generating a likelihood of an event including an error occurring at a residential or commercial access control system. Generally, the process 300 includes receiving, from a first monitoring system, data indicating a presence of a user at a first property monitored by the first monitoring system; in response to the data indicating the presence of the user, obtaining, from a second monitoring system, data from one or more sensors located at a second property monitored by the second monitoring system; determining that the data from the one or more sensors does not match predetermined data that indicates a particular status of the second property; and, based on determining that the data from the one or more sensors does not match the predetermined data, determining whether to generate, and send to the user, a notification indicating that the data from the one or more sensors does not match the predetermined data.

During 302, the monitoring server 134 may receive, from a first monitoring system, data indicating presence of a user at a first property monitored by the first monitoring system. In some implementations, the monitoring server 134 may receive data from the control unit server 104b that indicates presence of user 124a at the commercial facility 136. For example, the monitoring server 134 may receive a notification in response to the control unit server 104b determining user 124a has badged in at the commercial facility 136.

During 304, the monitoring server 134 obtains, from a second monitoring system, data from one or more sensors located at a second property monitored by the second monitoring system. In some implementations, the monitoring server 134 may obtain data from the one or more sensors 114a via the control unit server 104a located at the residential facility 102. For example, the monitoring server 134 may obtain a notification from the control unit server 104a in response to the control unit server 104a determining user 124a left garage door 127 open after arming the residential facility 102.

During 306, the monitoring server 134 determines that the data from the one or more sensors does not match predetermined data that indicates a particular status of the second property. In some implementations, the monitoring server 134 determines that the data from the one or more sensors 114a received from the control unit server 104a, indicating user 124a left garage door 127 open, does not match predetermined data that indicates a particular status of the second property, e.g., a determination that all devices should be locked at the residential facility 102 when the residential facility 102 is armed.

During 308, the monitoring server 134 determines whether to generate, and send to the user 124a, a notification indicating that the data from the one or more sensors 114b does not match the predetermined data based on determining that the data from the one or more sensors 114b does not match the predetermined data. In some implementations, the monitoring server 134 determines whether to generate a notification to transmit to user 124a indicating that while the user 124a is located at the commercial facility 136, the garage door 127 is left open. For example, the monitoring server 134 may determine from user 124a's signature profile how the user prefers to receive notifications, such as via an auditory, visual, or text message, or any combination of the three. The monitoring server 134 may transmit the notification to the user 124a via the control unit server 104a.

FIG. 4 is a flowchart of an example process for providing instructions to a second monitoring system based on a user's departure from a first monitoring system and an expected arrival time at the second monitoring system. Generally, the process 400 includes receiving, from a first monitoring system, data indicating that a user is exiting a first property monitored by the first monitoring system; determining that the user is likely traveling to a second property monitored by a second monitoring system; determining a time that the user is expected to arrive at the second property; and, providing, to the second monitoring system, instructions to adjust, by the expected arrival time, systems and devices located at the second property.

During 402, the monitoring server 134 may receive, from a first monitoring system, data indicating that a user is exiting a first property monitored by the first monitoring system. In some implementations, the monitoring server 134 may receive a notification from control unit server 104b that user 124a has departed the commercial facility 136. For example, the monitoring server 134 may receive a notification from control unit server 104b when user 124a has departed the commercial facility via badging out, arming the commercial facility 136, or any type of geo-service tracking of client device 122a.

During 404, the monitoring server 134 may determine that the user is likely traveling to a second property monitored by a second monitoring system. In some implementations, the monitoring server 134 may determine that the user 124a is likely traveling to the residential facility 102 from the commercial facility 136 by utilizing one or more factors. The monitoring server 134 may determine from learned activity patterns of a particular day of the week, a particular time of day, and a subsequent action to occur at this time of day. For example, the monitoring server 134 may learn that every Monday, at 5:00 PM, the user 124a badges out of commercial facility 136 and 25-30 minutes later disarms residential facility 102 and unlocks the front door 120a. In addition, the monitoring server 134 may use a geo-service to track client device 122a of user 124a to determine that user 124a is moving at a particular speed in a direction towards the residential facility 102 down road 130.

During 406, the monitoring server 134 may determine a time that the user is expected to arrive at the second property. In some implementations, the monitoring server 134 may determine the time the user 124a is expected to arrive at the residential facility 102 based on learning the commute time from the commercial facility 136 to the residential facility 102 is 25-30 minutes (129). In other implementations, the monitoring server 134 may determine the time the user 124a is expected to arrive at the residential facility 102 based on retrieved traffic reports. Additionally, the user 124a may enable a signature profile for a pre-arrival environment at residential facility 102, which turns on the geo-service to track client device 122a of user 124a.

During 408, the monitoring server 134 may provide, to the second monitoring system, instructions to adjust, by the expected arrival time, systems and devices located at the second property. In some implementations, the monitoring server 134 notifies the control unit server 104a to set the pre-arrival environment settings at the estimated arrival time of the user 124a. In other implementations, the monitoring server 134 notifies the control unit server 104a to set the pre-arrival environment settings immediately following a notification that user 124a has departed the commercial facility 102. The pre-arrival environment settings at the house 102 may play a particular song out of the one or more speakers 108a, the one or more lights 112a to a particular brightness, a thermostat set to a particular temperature, and a television tuned to a specific channel.

Figure 5:
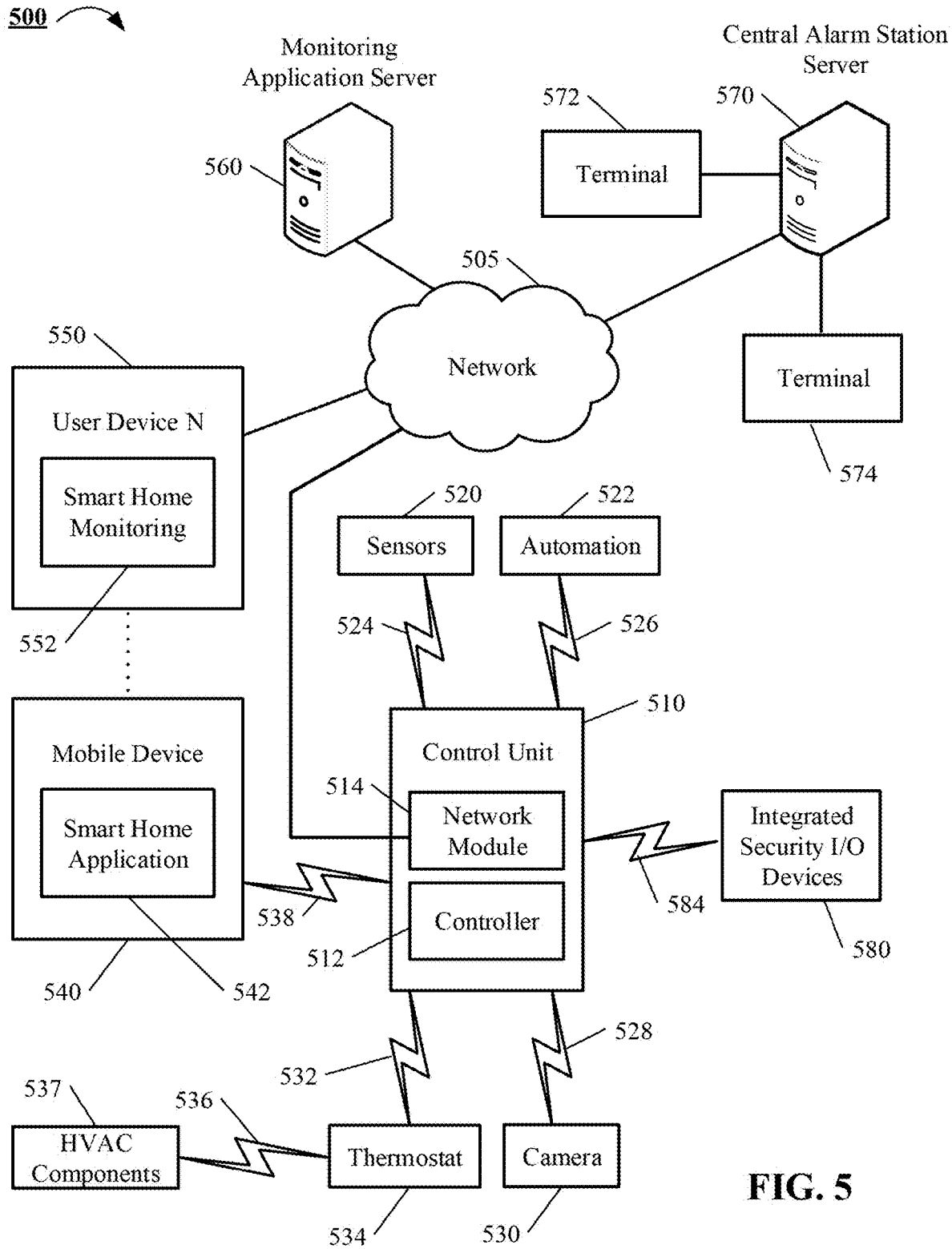
FIG. 5 is a block diagram of an example integrated monitoring server 500 for monitoring control units at residential and commercial facilities that may utilize various security components.

FIG. 5 is a block diagram of an example integrated monitoring server 500 for monitoring control units at residential and commercial facilities that may utilize various security components. The electronic system 500 includes a network 505, a control unit 510, one or more user devices 540 and 550, a monitoring application server 560, and a central alarm station server 570. In some examples, the network 505 facilitates communications between the control unit 510, the one or more user devices 540 and 550, the monitoring application server 560, and the central alarm station server 570.

The network 505 is configured to enable exchange of electronic communications between devices connected to the network 505. For example, the network 505 may be configured to enable exchange of electronic communications between the control unit 510, the one or more user devices 540 and 550, the monitoring application server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoTP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a control unit system. In these examples, the controller 512 may be configured to receive input from sensors, flow meters, or other devices included in the control unit system and control operations of devices included in the household (e.g., speakers, lights, doors, etc.). For example, the controller 512 may be configured to control operation of the network module 514 included in the control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit 510 to communicate over a local area network and/or the Internet. The network module 514 also may be a voiceband modem configured to enable the alarm panel to communicate over the telephone lines of Plain Old Telephone Systems (POTS).

The control unit system that includes the control unit 510 includes one or more sensors. For example, the monitoring system may include multiple sensors 520. The sensors 520 may include a lock sensor, a contact sensor, a motion sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 520 may include a radio-frequency identification (RFID) sensor that identifies a particular article that includes a pre-assigned RFID tag.

The control unit 510 communicates with the module 522 and the camera 530 to perform monitoring. The module 522 is connected to one or more devices that enable home automation control. For instance, the module 522 may be connected to one or more lighting systems and may be configured to control operation of the one or more lighting systems. Also, the module 522 may be connected to one or more electronic locks at the property and may be configured to control operation of the one or more electronic locks (e.g., control Z-Wave locks using wireless communications in the Z-Wave protocol. Further, the module 522 may be connected to one or more appliances at the property and may be configured to control operation of the one or more appliances. The module 522 may include multiple modules that are each specific to the type of device being controlled in an automated manner. The module 522 may control the one or more devices based on commands received from the control unit 510. For instance, the module 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of an area within a building or within a residential facility 102 monitored by the control unit 510. The camera 530 may be configured to capture single, static images of the area and also video images of the area in which multiple images of the area are captured at a relatively high frequency (e.g., thirty images per second). The camera 530 may be controlled based on commands received from the control unit 510.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PTR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the module 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the control unit 510. The camera 530 may employ a small solar cell to recharge the battery when light is available. Alternatively, the camera 530 may be powered by the controller's 512 power supply if the camera 530 is co-located with the controller 512.

In some implementations, the camera 530 communicates directly with the monitoring application server 560 over the Internet. In these implementations, image data captured by the camera 530 does not pass through the control connected valve unit 510 and the camera 530 receives commands related to operation from the monitoring application server 560.

The system 500 also includes thermostat 534 to perform dynamic environmental control at the property. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a property and/or environmental data at a property, e.g., at various locations indoors and outdoors at the property. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534.

A module 537 is connected to one or more components of an HVAC system associated with a property, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

In some examples, the system 500 further includes one or more robotic devices. The robotic devices may be any type of robots that are capable of moving and taking actions that assist in security monitoring. For example, the robotic devices may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices may be robotic devices that are intended for other purposes and merely associated with the monitoring system 500 for use in appropriate circumstances. For instance, a robotic vacuum cleaner device may be associated with the monitoring system 500 as one of the robotic devices and may be controlled to take action responsive to monitoring system events.

In some examples, the robotic devices automatically navigate within a property. In these examples, the robotic devices include sensors and control processors that guide movement of the robotic devices within the property. For instance, the robotic devices may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices may include control processors that process output from the various sensors and control the robotic devices to move along a path that reaches the desired destination and avoids obstacles. In this regard, the control processors detect walls or other obstacles in the property and guide movement of the robotic devices in a manner that avoids the walls and other obstacles.

In addition, the robotic devices may store data that describes attributes of the property. For instance, the robotic devices may store a floorplan and/or a three-dimensional model of the property that enables the robotic devices to navigate the property. During initial configuration, the robotic devices may receive the data describing attributes of the property, determine a frame of reference to the data (e.g., a home or reference location in the property), and navigate the property based on the frame of reference and the data describing attributes of the property. Further, initial configuration of the robotic devices also may include learning of one or more navigation patterns in which a user provides input to control the robotic devices to perform a specific navigation action (e.g., fly to an upstairs bedroom and spin around while capturing video and then return to a home charging base). In this regard, the robotic devices may learn and store the navigation patterns such that the robotic devices may automatically repeat the specific navigation actions upon a later request.

In some examples, the robotic devices may include data capture and recording devices. In these examples, the robotic devices may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users in the property. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices to take and store a biometric sample that can be used to identify the person (e.g., a biometric sample with DNA that can be used for DNA testing).

In some implementations, the robotic devices may include output devices. In these implementations, the robotic devices may include one or more displays, one or more speakers, and/or any type of output devices that allow the robotic devices to communicate information to a nearby user.

The robotic devices also may include a communication module that enables the robotic devices to communicate with the control unit 510, each other, and/or other devices. The communication module may be a wireless communication module that allows the robotic devices to communicate wirelessly. For instance, the communication module may be a Wi-Fi module that enables the robotic devices to communicate over a local wireless network at the property. The communication module further may be a 900 MHz wireless communication module that enables the robotic devices to communicate directly with the control unit 510. Other types of short-range wireless communication protocols, such as Bluetooth, Bluetooth LE, Zwave, Zigbee, etc., may be used to allow the robotic devices to communicate with other devices in the property.

The robotic devices further may include processor and storage capabilities. The robotic devices may include any suitable processing devices that enable the robotic devices to operate applications and perform the actions described throughout this disclosure. In addition, the robotic devices may include solid state electronic storage that enables the robotic devices to store applications, configuration data, collected sensor data, and/or any other type of information available to the robotic devices.

The robotic devices are associated with one or more charging stations. The charging stations may be located at predefined home base or reference locations in the property. The robotic devices may be configured to navigate to the charging stations after completion of tasks needed to be performed for the monitoring system 500. For instance, after completion of a monitoring operation or upon instruction by the control unit 510, the robotic devices may be configured to automatically fly to and land on one of the charging stations. In this regard, the robotic devices may automatically maintain a fully charged battery in a state in which the robotic devices are ready for use by the monitoring system 500.

The charging stations may be contact based charging stations and/or wireless charging stations. For contact based charging stations, the robotic devices may have readily accessible points of contact that the robotic devices are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices may charge through a wireless exchange of power. In these cases, the robotic devices need only locate themselves closely enough to the wireless charging stations for the wireless exchange of power to occur. In this regard, the positioning needed to land at a predefined home base or reference location in the property may be less precise than with a contact based charging station. Based on the robotic devices landing at a wireless charging station, the wireless charging station outputs a wireless signal that the robotic devices receive and convert to a power signal that charges a battery maintained on the robotic devices.

In some implementations, each of the robotic devices has a corresponding and assigned charging station such that the number of robotic devices equals the number of charging stations. In these implementations, the robotic devices always navigate to the specific charging station assigned to that robotic device. For instance, a first robotic device may always use a first charging station and a second robotic device may always use a second charging station.

In some examples, the robotic devices may share charging stations. For instance, the robotic devices may use one or more community charging stations that are capable of charging multiple robotic devices. The community charging station may be configured to charge multiple robotic devices in parallel. The community charging station may be configured to charge multiple robotic devices in serial such that the multiple robotic devices take turns charging and, when fully charged, return to a predefined home base or reference location in the property that is not associated with a charger. The number of community charging stations may be less than the number of robotic devices.

Also, the charging stations may not be assigned to specific robotic devices and may be capable of charging any of the robotic devices. In this regard, the robotic devices may use any suitable, unoccupied charging station when not in use. For instance, when one of the robotic devices has completed an operation or is in need of battery charge, the control unit 510 references a stored table of the occupancy status of each charging station and instructs the robotic device to navigate to the nearest charging station that is unoccupied.

The system 500 further includes one or more integrated security devices 580. The one or more integrated security devices may include any type of device used to provide alerts based on received sensory data. For instance, the one or more control units 510 may provide one or more alerts to the one or more integrated security input/output devices. Additionally, the one or more control units 510 may receive one or more sensory data from the sensors 520 and determine whether to provide an alert to the one or more integrated security input/output devices 580.

The sensors 520, the module 522, the camera 530, the thermostat 534, and the integrated security devices 580 communicate with the controller 512 over communication links 524, 526, 528, 532, and 584. The communication links 524, 526, 528, 532, and 584 may be a wired or wireless data pathway configured to transmit signals from the sensors 520, the module 522, the camera 530, the thermostat 534, and the integrated security devices 580 to the controller 512. The sensors 520, the module 522, the camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, and 584 may include a local network. The sensors 520, the module 522, the camera 530, the thermostat 534, and the integrated security devices 580, and the controller 512 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring application server 560 is an electronic device configured to provide monitoring services by exchanging electronic communications with the control unit 510, the one or more user devices 540 and 550, and the central alarm station server 570 over the network 505. For example, the monitoring application server 560 may be configured to monitor events (e.g., alarm events) generated by the control unit 510. In this example, the monitoring application server 560 may exchange electronic communications with the network module 514 included in the control unit 510 to receive information regarding events (e.g., alerts) detected by the control unit server 104*a*. The monitoring application server 560 also may receive information regarding events (e.g., alerts) from the one or more user devices 540 and 550.

In some examples, the monitoring application server 560 may route alert data received from the network module 514 or the one or more user devices 540 and 550 to the central alarm station server 570. For example, the monitoring application server 560 may transmit the alert data to the central alarm station server 570 over the network 505.

The monitoring application server 560 may store sensor and image data received from the monitoring system and perform analysis of sensor and image data received from the monitoring system. Based on the analysis, the monitoring application server 560 may communicate with and control aspects of the control unit 510 or the one or more user devices 540 and 550.

The central alarm station server 570 is an electronic device configured to provide alarm monitoring service by exchanging communications with the control unit 510, the one or more mobile devices 540 and 550, and the monitoring application server 560 over the network 505. For example, the central alarm station server 570 may be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more mobile devices 540 and 550 and/or the monitoring application server 560.

The central alarm station server 570 is connected to multiple terminals 572 and 574. The terminals 572 and 574 may be used by operators to process alerting events. For example, the central alarm station server 570 may route alerting data to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more user devices 540 and 550 are devices that host and display user interfaces. For instance, the user device 540 is a mobile device that hosts one or more native applications (e.g., the smart home application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a smart home application 542. The smart home application 542 refers to a software/firmware program running on the corresponding mobile device that enables the user interface and features described throughout. The user device 540 may load or install the smart home application 542 based on data received over a network or data received from local media. The smart home application 542 runs on mobile devices platforms, such as iPhone, iPod touch, Blackberry, Google Android, Windows Mobile, etc. The smart home application 542 enables the user device 540 to receive and process image and sensor data from the monitoring system.

The user device 550 may be a general-purpose computer (e.g., a desktop personal computer, a workstation, or a laptop computer) that is configured to communicate with the monitoring application server 560 and/or the control unit 510 over the network 505. The user device 550 may be configured to display a smart home user interface 552 that is generated by the user device 550 or generated by the monitoring application server 560. For example, the user device 550 may be configured to display a user interface (e.g., a web page) provided by the monitoring application server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Zwave, Zigbee, HomePlug (ethernet over powerline), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring application server 560) may be significantly slower.

Although the one or more user devices 540 and 550 are shown as communicating with the control unit 510, the one or more user devices 540 and 550 may communicate directly with the sensors and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring application server 560 may relay data received from the control unit 510 to the one or more user devices 540 and 550 through the network 505. In this regard, the monitoring application server 560 may facilitate communication between the one or more user devices 540 and 550 and the monitoring system.

In some implementations, the one or more user devices 540 and 550 may be configured to switch whether the one or more user devices 540 and 550 communicate with the control unit 510 directly (e.g., through link 538) or through the monitoring application server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring application server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 only includes the one or more user devices 540 and 550, the sensors 520, the module 522, the camera 530, and the robotic devices. The one or more user devices 540 and 550 receive data directly from the sensors 520, the module 522, the camera 530, and the robotic devices and sends data directly to the sensors 520, the module 522, the camera 530, and the robotic devices. The one or more user devices 540, 550 provide the appropriate interfaces/processing to provide visual surveillance and reporting.

In other implementations, the system 500 further includes network 505 and the sensors 520, the module 522, the camera 530, the thermostat 534, and the robotic devices are configured to communicate sensor and image data to the one or more user devices 540 and 550 over network 505 (e.g., the Internet, cellular network, etc.). In yet another implementation, the sensors 520, the module 522, the camera 530, the thermostat 534, and the robotic devices (or a component, such as a bridge/router) are intelligent enough to change the communication pathway from a direct local pathway when the one or more user devices 540 and 550 are in close physical proximity to the sensors 520, the module 522, the camera 530, the thermostat 534, and the robotic devices to a pathway over network 505 when the one or more user devices 540 and 550 are farther from the sensors 520, the module 522, the camera 530, the thermostat 534, and the robotic devices. In some examples, the system leverages GPS information from the one or more user devices 540 and 550 to determine whether the one or more user devices 540 and 550 are close enough to the sensors 520, the module 522, the camera 530, the thermostat 534, and the robotic devices to use the direct local pathway or whether the one or more user devices 540 and 550 are far enough from the sensors 520, the module 522, the camera 530, the thermostat 534, and the robotic devices that the pathway over network 505 is required. In other examples, the system leverages status communications (e.g., pinging) between the one or more user devices 540 and 550 and the sensors 520, the module 522, the camera 530, the thermostat 534, and the robotic devices to determine whether communication using the direct local pathway is possible. If communication using the direct local pathway is possible, the one or more user devices 540 and 550 communicate with the sensors 520, the module 522, the camera 530, the thermostat 534, and the robotic devices using the direct local pathway. If communication using the direct local pathway is not possible, the one or more user devices 540 and 550 communicate with the sensors 520, the module 522, the camera 530, the thermostat 534, and the robotic devices using the pathway over network 505.

In some implementations, the system 500 provides end users with access to images captured by the camera 530 to aid in decision making. The system 500 may transmit the images captured by the camera 530 over a wireless WAN network to the user devices 540 and 550. Because transmission over a wireless WAN network may be relatively expensive, the system 500 uses several techniques to reduce costs while providing access to significant levels of useful visual information.

In some implementations, a state of the monitoring system and other events sensed by the monitoring system may be used to enable/disable video/image recording devices (e.g., the camera 530). In these implementations, the camera 530 may be set to capture images on a periodic basis when the alarm system is armed in an "Away" state, but set not to capture images when the alarm system is armed in a "Stay" state or disarmed. In addition, the camera 530 may be triggered to begin capturing images when the alarm system detects an event, such as an alarm event, a door-opening event for a door that leads to an area within a field of view of the camera 530, or motion in the area within the field of view of the camera 530. In other implementations, the camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method comprising:
    accessing, by a first system for a property, first sensor data generated by one or more first sensors located at the property;
    receiving, by the first system across a network from a second system other than the first system for the property, second sensor data captured by one or more second sensors for the second system;
    determining, using the first sensor data and the second sensor data, whether to perform an action for the property, the determining comprising determining whether the second sensor data conflicts with the first sensor data; and
    in response to determining to perform the action for the property and that the second sensor data conflicts with the first sensor data, performing the action for the property.

2. The method of claim 1, wherein:
    determining whether to perform an action for the property comprises:
        determining, using the first sensor data, a status for a portion of the property; and
        determining, using the second sensor data, whether the second sensor data and the status for the portion of the property satisfy a property criterion; and
    performing the action is responsive to determining that the second sensor data and the status for the portion of the property satisfy the property criterion.

3. The method of claim 2, wherein:
    determining the status for the portion of the property comprises determining that a door at the property is unlocked, open, or both; and
    performing the action comprises sending an instruction to cause the door to lock, close, or both.

4. The method of claim 2, comprising:
    maintaining a database of one or more property activity patterns, wherein:
    determining whether the second sensor data and the status for the portion of the property satisfy the property criterion comprises determining that the second sensor data and the status for the portion of the property are not likely similar to a property activity pattern from the one or more property activity patterns; and
    performing the action is responsive to determining that the second sensor data and the status for the portion of the property are not likely similar to the property activity pattern from the one or more property activity patterns.

5. The method of claim 2, comprising:
    maintaining a database of one or more property activity patterns, wherein:
    determining whether the second sensor data and the status for the portion of the property satisfy the property criterion comprises determining, for each property activity pattern in the one or more property activity patterns, that the second sensor data and the status for the portion of the property are not likely similar to the respective property activity pattern; and
    performing the action is responsive to determining that the second sensor data and the status for the portion of the property are not likely similar to any property activity pattern from the one or more property activity patterns.

6. The method of claim 1, wherein performing the action comprises transmitting an instruction that indicates that the second sensor data conflicts with the first sensor data.

7. The method of claim 1, wherein the second system comprises a system for a second, different property or a vehicle.

8. A system comprising one or more computers and one or more storage devices on which are stored instructions that are operable, when executed by the one or more computers, to cause the one or more computers to perform operations comprising:
    accessing, by a first system for a property, first sensor data generated by one or more first sensors located at the property;
    receiving, by the first system across a network from a second system other than the first system for the property, second sensor data captured by one or more second sensors for the second system;
    determining, using the first sensor data and the second sensor data, whether to perform an action for the property, the determining comprising determining whether the second sensor data conflicts with the first sensor data; and
    in response to determining to perform the action for the property and that the second sensor data conflicts with the first sensor data, performing the action for the property.

9. The system of claim 8, wherein:
    determining whether to perform an action for the property comprises:
        determining, using the first sensor data, a status for a portion of the property; and
        determining, using the second sensor data, whether the second sensor data and the status for the portion of the property satisfy a property criterion; and
    performing the action is responsive to determining that the second sensor data and the status for the portion of the property satisfy the property criterion.

10. The system of claim 9, wherein:
  determining the status for the portion of the property comprises determining that a door at the property is unlocked, open, or both; and
  performing the action comprises sending an instruction to cause the door to lock, close, or both.

11. The system of claim 9, the operations comprising:
  maintaining a database of one or more property activity patterns, wherein:
  determining whether the second sensor data and the status for the portion of the property satisfy the property criterion comprises determining that the second sensor data and the status for the portion of the property are not likely similar to a property activity pattern from the one or more property activity patterns; and
  performing the action is responsive to determining that the second sensor data and the status for the portion of the property are not likely similar to the property activity pattern from the one or more property activity patterns.

12. The system of claim 9, the operations comprising:
  maintaining a database of one or more property activity patterns, wherein:
  determining whether the second sensor data and the status for the portion of the property satisfy the property criterion comprises determining, for each property activity pattern in the one or more property activity patterns, that the second sensor data and the status for the portion of the property are not likely similar to the respective property activity pattern; and
  performing the action is responsive to determining that the second sensor data and the status for the portion of the property are not likely similar to any property activity pattern from the one or more property activity patterns.

13. The system of claim 8, wherein performing the action comprises transmitting an instruction that indicates that the second sensor data conflicts with the first sensor data.

14. The system of claim 8, wherein the second system comprises a system for a second, different property or a vehicle.

15. One or more non-transitory computer storage media encoded with instructions that, when executed by one or more computers, cause the one or more computers to perform operations comprising:
  accessing, by a first system for a property, first sensor data generated by one or more first sensors located at the property;
  receiving, by the first system across a network from a second system other than the first system for the property, second sensor data captured by one or more second sensors for the second system;
  determining, using the first sensor data and the second sensor data, whether to perform an action for the property, the determining comprising determining whether the second sensor data conflicts with the first sensor data; and
  in response to determining to perform the action for the property and that the second sensor data conflicts with the first sensor data, performing the action for the property.

16. The computer storage media of claim 15, wherein:
  determining whether to perform an action for the property comprises:
    determining, using the first sensor data, a status for a portion of the property; and
    determining, using the second sensor data, whether the second sensor data and the status for the portion of the property satisfy a property criterion; and
  performing the action is responsive to determining that the second sensor data and the status for the portion of the property satisfy the property criterion.

17. The computer storage media of claim 16, wherein:
  determining the status for the portion of the property comprises determining that a door at the property is unlocked, open, or both; and
  performing the action comprises sending an instruction to cause the door to lock, close, or both.

18. The computer storage media of claim 16, the operations comprising:
  maintaining a database of one or more property activity patterns, wherein:
  determining whether the second sensor data and the status for the portion of the property satisfy the property criterion comprises determining that the second sensor data and the status for the portion of the property are not likely similar to a property activity pattern from the one or more property activity patterns; and
  performing the action is responsive to determining that the second sensor data and the status for the portion of the property are not likely similar to the property activity pattern from the one or more property activity patterns.

19. The computer storage media of claim 16, the operations comprising:
  maintaining a database of one or more property activity patterns, wherein:
  determining whether the second sensor data and the status for the portion of the property satisfy the property criterion comprises determining, for each property activity pattern in the one or more property activity patterns, that the second sensor data and the status for the portion of the property are not likely similar to the respective property activity pattern; and
  performing the action is responsive to determining that the second sensor data and the status for the portion of the property are not likely similar to any property activity pattern from the one or more property activity patterns.

20. The computer storage media of claim 15, wherein performing the action comprises transmitting an instruction that indicates that the second sensor data conflicts with the first sensor data.

* * * * *